United States Patent
Carr et al.

(10) Patent No.: US 6,607,923 B2
(45) Date of Patent: *Aug. 19, 2003

(54) METHOD OF MAKING MAGNETORESISTIVE READ/ INDUCTIVE WRITE MAGNETIC HEAD ASSEMBLY FABRICATED WITH SILICON ON HARD INSULATOR FOR IMPROVED DURABILITY AND ELECTROSTATIC DISCHARGE PROTECTION

(75) Inventors: Jeffrey William Carr, Morgan Hill, CA (US); Moris Musa Dovek, San Carlos, CA (US); Mohamad Towfik Krounbi, San Jose, CA (US)

(73) Assignee: Hitachi Global Technologies, Amsterdam (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/034,457

(22) Filed: Mar. 4, 1998

(65) Prior Publication Data

US 2002/0048824 A1 Apr. 25, 2002

Related U.S. Application Data

(62) Division of application No. 08/756,294, filed on Nov. 25, 1994, now Pat. No. 5,757,591.
(51) Int. Cl.$^7$ .............................................. H01L 21/00
(52) U.S. Cl. ........................... 438/3; 438/128; 438/131
(58) Field of Search ........................... 438/3, 132, 128, 438/131; 360/103, 104, 323, 106

(56) References Cited

U.S. PATENT DOCUMENTS

| | | | |
|---|---|---|---|
| 4,219,853 A | 8/1980 | Albert et al. | 360/103 |
| 4,246,695 A | 1/1981 | Tsui | 29/603 |
| 4,321,641 A | 3/1982 | Lee | 360/126 |
| 4,430,440 A | 2/1984 | Wada et al. | 501/105 |
| 4,809,103 A | 2/1989 | Lazzari | 360/103 |

(List continued on next page.)

FOREIGN PATENT DOCUMENTS

JP     08-227508     9/1936

OTHER PUBLICATIONS

IBM Technical Disclosure Bulletin, vol. 33, No. 3B, Aug. 1990, pp. 209–211.

(List continued on next page.)

*Primary Examiner*—Olik Chaudhuri
*Assistant Examiner*—Hsien-Ming Lee

(57) ABSTRACT

A magnetoresistive read/inductive write magnetic head assembly formed on a hard electrically insulating substrate and having electrostatic discharge protection comprises: a hard electrically insulating substrate, preferably formed of sapphire or alumina-TiC; multiple alumina layers formed over the substrate; a magnetoresistive read/inductive write head positioned between the alumina layers; a silicon layer supported by the substrate; and a semiconducting circuit integrated into the silicon layer and interconnected with said magnetoresistive read/write inductive write head to provide electrostatic discharge protection to the head. The silicon layer may be epitaxially grown on the substrate when implemented as sapphire, or bonded to the substrate when implemented as alumina-TiC. The hard electrically insulating substrate and alumina layers provide the assembly with a hard air bearing surface having generally uniform lapping and etching characteristics, and excellent durability.

8 Claims, 7 Drawing Sheets

U.S. PATENT DOCUMENTS

| | | | | |
|---|---|---|---|---|
| 4,989,057 A | * | 1/1991 | Lu | 357/23.7 |
| 5,276,573 A | | 1/1994 | Harada et al. | 360/103 |
| 5,305,165 A | | 4/1994 | Brezoczky et al. | 360/103 |
| 5,347,412 A | | 9/1994 | Nitta et al. | 360/103 |
| 5,454,158 A | | 10/1995 | Fontana, Jr. et al. | 29/603 |
| 5,465,186 A | | 11/1995 | Bajorek et al. | 360/113 |
| 5,473,486 A | | 12/1995 | Nepela et al. | 360/103 |
| 5,491,605 A | * | 2/1996 | Hughbanks et al. | 360/113 |
| 5,587,857 A | * | 12/1996 | Voldman et al. | 360/103 |
| 5,712,747 A | * | 1/1998 | Voldman et al. | 360/103 |

OTHER PUBLICATIONS

IBM Technical Disclosure Bulletin, vol. 38, No. 01, Jan. 1995, pp. 401–404.

IBM Technical Disclosure Bulletin, vol. 38, No. 07, Jul. 1995, pp. 483–494.

* cited by examiner

METHOD OF MAKING MAGNETORESISTIVE READ/ INDUCTIVE WRITE MAGNETIC HEAD ASSEMBLY FABRICATED WITH SILICON ON HARD INSULATOR FOR IMPROVED DURABILITY AND ELECTROSTATIC DISCHARGE PROTECTION

CROSS REFERENCE TO RELATED APPLICATION

This is a divisional application of U.S. application Ser. No. 08/756,294 filed Nov. 25, 1996 now U.S. Pat. No. 5,757,591.

BACKGROUND OF THE INVENTION

1. Field of the Invention

The present invention relates to magnetic disk drives and more particularly to read/write transducers utilizing magnetoresistive read sensors protected against electrostatic discharge by semiconducting circuits elements integrated in a layer of silicon attached to a hard, insulating substrate, and further having a hard air bearing surface.

2. Description of the Related Art

Magnetic head disk drive systems have been widely accepted in the computer industry as a cost effective form of data storage. In a magnetic disk drive system, a magnetic recording medium in the form of a disk rotates at high speed while a magnetic read/write transducer, referred to as a magnetic head, "flies" slightly above the surface of the rotating disk. The magnetic disk is rotated by means of a spindle drive motor. The magnetic head is attached to or formed integrally with a "slider" which is suspended over the disk on a spring-loaded support arm known as the actuator arm. As the magnetic disk rotates at operating speed, the moving air generated by the rotating disk in conjunction with the physical design of the slider lifts the magnetic head, allowing it to glide or "fly" slightly above and over the disk surface on a cushion of air, referred to as an air bearing. The flying height of the magnetic head over the disk surface is typically only a few microinches or less and is primarily a function of disk rotation, the aerodynamic properties of the slider assembly and the force exerted by the spring-loaded actuator arm.

Magnetoresistive sensors, also referred to as "MR heads," are particularly useful as read elements in magnetic transducers, especially at high data recording densities. The MR sensor provides a higher output signal than an inductive read head. This higher output signal results in a higher signal-to-noise ratio for the recording channel and allows higher areal density of recorded data on a magnetic disk surface.

MR heads are typically fabricated on a ceramic substrate of alumina-TiC. However, the ever decreasing cross-sectional area of MR heads, as a result of both film thickness and stripe height reductions, has resulted in increased electrostatic discharge (ESD) sensitivity. Spin valve materials have an additional reversible failure mode when subjected to an electrostatic discharge: underpinning of the pinned layer due to the low blocking temperature of the antiferromagnet.

Static charges may be produced by the presence of certain materials, such as plastics, during manufacture and subsequent handling of the heads, for example. These charges arc across the edge of the insulating layer between the magnetic pole tips and adjacent conductive layers which are exposed and positioned adjacent to the transducing gap at the slider air bearing surface facing the recording medium. This discharge causes erosion of the pole tips and degradation of the transducer in reading and writing data.

As described above, when an MR sensor is exposed to ESD, or even a voltage or current input larger than that intended under normal operating conditions, referred to as electrical overstress or EOS, the MR sensor and other parts of the head may be damaged. This sensitivity to electrical damage is particularly severe for MR read sensors because of their relatively small physical size. For example, an MR sensor used for extremely high recording densities will have a cross-section of 100 Angstroms (A) by 1.0 micrometers (um) or smaller. Discharge of voltages of only a few volts through such a physically small sensor, behaving like a resistor, is sufficient to produce currents capable of severely damaging or completely destroying the MR sensor. The nature of the damage which may be experienced by an MR sensor varies significantly, including complete destruction of the sensor via melting and evaporation, contamination of the air bearing surface, generation of shorts via electrical breakdown, and milder forms of damage in which the head performance may be degraded. This type of damage to the MR head has been found to occur during both processing and operational use, and poses a serious problem in the manufacturing and handling of magnetic heads incorporating MR read sensors.

Electrostatic discharge (ESD) problems associated with the thin film inductive read/write heads are well documented and several solutions have been proposed. Elser et al. U.S. Pat. No. 4,317,149 discloses an inductive head having short discharge paths formed by the deposition of conductive material in recesses formed in an insulating layer so that the static electric discharge will occur in areas displaced from the critical pole tip and gap area at the slider air bearing surface. Schwartz et al. U.S. Pat. No. 4,800,454 discloses an inductive head assembly wherein the magnetic pole piece and the inductive coil winding are coupled to the slider to allow discharge of any static electric charges which may build up. The winding is connected to the slider body via a diode with high forward and reverse voltage drops, or through a fusible link.

U.S. Pat. No. 5,465,186 describes an approach for protecting a magnetic read/write transducer from the effects of electrical overstress and electrostatic discharge during the manufacture and assembly of a magnetic storage system. The conductive leads of a magnetoresistive (MR) sensor element are shorted together to provide a low resistance, conductive path that bypasses the MR element and minimizes electrical current through the MR sensing element during discharge of static electrical charge. The MR sensor lead terminal pads are shorted together by soldering. The other transducer elements such as the MR magnetic shields, the inductive coil and the inductive magnetic yoke structure may also be shorted to the MR sensor leads by soldering the lead terminal pads together at the slider surface. Alternatively, a twisted conductor pair may be used to short the MR terminals together. Remotely located protective devices, such as reversed diode pairs, can also be connected across the MR sensor element using the twisted pair. The short is removed prior to placing the MR head into operation in the magnetic storage system.

U.S. Pat. No. 5,491,605 describes a scheme for protecting a magnetic read/write transducer from EOS and ESD. The elements of the MR and inductive heads are shorted together and to the slider substrate to provide a low resistance, conductive path that bypasses the MR sensor element and minimizes current through the MR element during discharge of electrostatic charge. The MR sensor element, the MR conductive leads, the MR magnetic shield elements and inductive pole tips exposed at the slider air bearing surface are shorted together and to the slider substrate by a layer of conductive material, such as tungsten, formed over the slider air bearing surface. The conductive layer shorts the head elements together and to the slider substrate, thus protecting the head against ESD/EOS damage during subsequent handling and assembly. The conductive layer is removed by wet etching prior to placing the magnetic head into operation in a magnetic storage system.

One limitation of the ESD and EOS protection schemes described above is that after removal of the soldered shorts or conductive layer, the head assembly again becomes vulnerable to EDS/EOS damage while subjected to further manufacturing processes and later in operation. Further, the removal of such shorts and/or conductive layers requires an additional manufacturing step which may cause damage to the heads.

Diodes have been shown to provide increased ESD protection without adversely affecting the testability of an MR head in various processing steps. Furthermore, if the capacitance of the forward biased diode can be kept to a minimum, they have also been shown to have no appreciable affect on the performance of the MR head in the file. However, the only kinds of diodes that can be fabricated on an alumina-TiC substrate are known as "thin film diodes," and their properties are not well understood.

Silicon is a commonly available, low cost material which supports well established p-n junction diode processes. P-n junction diodes fabricated on silicon have capacitances that are proportional to the forward bias current and the carrier recombination time. Since ESD protection is proportional to forward bias current, lower carrier recombination time is the only parameter that reduces the capacitance for a given level of ESD protection. Silicon has a lower hardness than alumina-TiC, and is therefore, easier to scratch than alumina-TiC. Therefore an MR head having an exposed silicon surface would result in inferior head-disk interface performance. Further, the yield strength of silicon is lower than that of alumina-TiC. Therefore, MR heads incorporating silicon structures would tend to break more easily in row form while being handled during the various manufacturing steps to which they would be subjected. Furthermore, overcoat materials, such as silicon dioxide ($SiO_2$) that are known to be compatible with a silicon substrate in air bearing patterning as they can be reactive ion etched or ion-milled at similar rates, have been observed to protrude above a silicon substrate when the air bearing surface is lapped. Such protrusions can result in hard disk contact, which can produce scratches on the surface of the disk.

A need therefore exists for providing an MR read/write head assembly with ESD/EOS protection that is permanently integrated into the MR head assembly in a cost effective manner using well known manufacturing techniques.

A further need exists for an MR head formed on a substrate having a hardness and yield strength that is comparable to alumina-TiC that will support the formation of basic solid-state type diodes.

Yet still another need exists for an MR head made from materials which are compatible with standard overcoat materials, where all such materials have similar lapping rates.

SUMMARY OF THE INVENTION

The present invention provides a magnetoresistive read/inductive write magnetic head assembly formed on a hard insulating substrate and having electrostatic discharge protection. The assembly comprises: a hard electrically insulating substrate, preferably formed of sapphire or alumina-TiC; multiple alumina layers formed over the substrate; a magnetoresistive read/inductive write head positioned between the alumina layers; a silicon layer supported by the substrate; and a semiconducting circuit integrated into the silicon layer and interconnected with said magnetoresistive read/write inductive write head which provides a short circuit path to absorb electrostatic discharge during manufacture of the assembly and in subsequent operation. The silicon layer may be epitaxially grown on the sapphire, or bonded to alumina-TiC. The hard insulating substrate and alumina layers provide the assembly with a hard air bearing surface having generally uniform lapping and etching characteristics, and therefore, excellent durability.

In another aspect of the invention, the assembly may comprise a hard insulating substrate, multiple alumina layers formed over the substrate; and a magnetoresistive read/inductive write head positioned between the alumina layers to provide the assembly with a hard air bearing surface having improved durability. Such improved durability facilitates handling and processing of the assembly during manufacture by reducing the risk of damage.

The invention may also be characterized as a method for manufacturing a magnetoresistive read/inductive write magnetic head assembly having electrostatic discharge protection and which is formed on a hard insulating substrate. The method comprises the steps of attaching a silicon layer to a substrate; integrating a semiconducting circuit in the silicon layer; forming a layered structure which includes a magnetoresistive read/inductive write head and layers of alumina on the substrate; and electrically interconnecting the semiconducting structure with the magnetoresistive read/inductive write head.

One advantage of the invention is that it provides an MR read/inductive write head assembly with ESD/EOS protection that is permanently integrated into the MR head assembly and which may be manufactured using standard photolithographic silicon processing.

Another advantage of the invention is that it provides an MR read/inductive write head assembly having a hard air bearing surface.

These and other advantages of the invention will become more readily apparent upon review of the accompanying figure and specification, including the claims.

BRIEF DESCRIPTION OF THE DRAWINGS

Throughout the several figures, like elements are referenced using like reference numbers.

DETAILED DESCRIPTION OF THE PREFERRED EMBODIMENT

Figure 1:
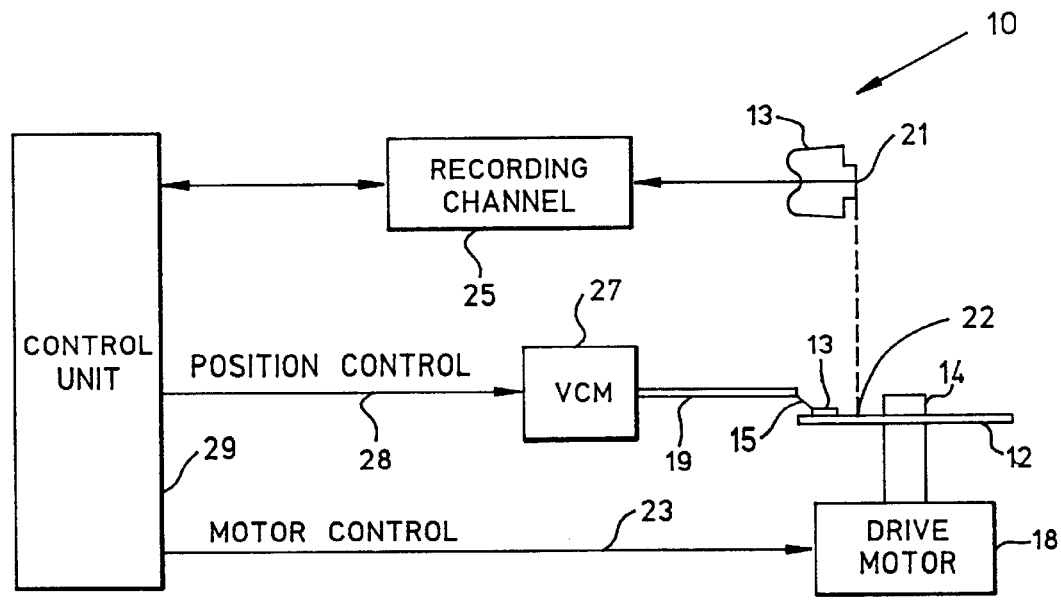
FIG. 1 is a simplified block diagram of a magnetic disk storage system embodying the present invention.

Referring to FIG. 1, the invention is described as embodied in a magnetic disk storage system 10. However, it is to be understood that the invention may also be used in other types of magnetic recording system such as a magnetic tape storage system, or in other types of systems in which a magnetoresistive (MR) sensor is used to detect a magnetic field. A magnetic disk storage system comprises at least one rotatable magnetic disk 12 supported on a spindle 14 and rotated by a disk drive motor 18 with at least one slider 13 positioned on the disk 12. Each slider 13 supports one or more magnetic read/write transducers 21, also referred to as MR read/inductive write heads, or simply as MR read/write heads. The magnetic recording media on each disk 12 forms an annular pattern of concentric data tracks (not shown). As the disks 12 rotate, the sliders 13 are moved radially in and out over the disk surface 22 so that the heads 21 may access different portions of the disk 12 where desired data is recorded or is to be written. Each slider 13 is attached to an actuator arm 19 by means of a suspension 15. The suspension 15 provides a slight spring force which biases the slider 13 against the disk surface 22. Each actuator arm 19 is attached to an actuator system 27, such as a voice coil motor (VCM), for example. The VCM comprises a coil moveable within a fixed magnetic field. The direction and velocity of the coil movements of the VCM are controlled by position control signals 28 provided by control unit 29.

During operation of the disk storage system 10, the rotation of the disk 12 generates an air bearing between the slider 13 and the disk surface 22 which exerts an upward force or lift on the slider. The air bearing counterbalances the slight spring force of the suspension 15 and supports the slider 13 slightly above the disk surface 22 by a small, substantially constant spacing during operation, generally in the range of about 1.0 to 2.0 microinches.

The various components of the disk storage system are controlled in operation by control signals generated by control unit 29, such as access control signals and internal clock signals. Typically, the control unit 29 comprises logic control circuits, storage means and a microprocessor. The control unit 29 generates drive motor control signals 23 and position control signals 28. The position control signals 28 provide current profiles to optimally move and position a selected slider 13 to a desired data track on the associated disk 12. The drive motor control signals 23 control the disk drive motor 18 which spins the disk 12. Read and write signals are communicated to and from read/write heads 21 by recording channel 25.

The above description of a typical magnetic disk storage system 10 and the accompanying FIG. 1 are for representation purposes only. It should be apparent that disk storage systems may contain a large number of disks and actuators, and each actuator may support a number of sliders.

Figures 2, 3:
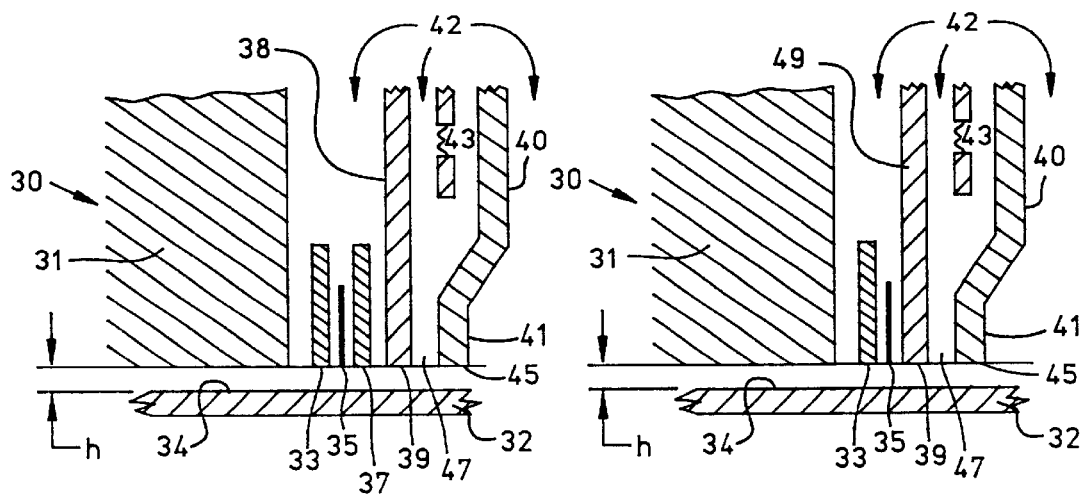
FIGS. 2 and 3 are cross-sectional views of magnetoresistive read/inductive write heads.

FIGS. 2 and 3 each show a cross-sectional view of an MR read/inductive write magnetic head assembly 30 (hereinafter also referenced as an "MR read/write head) in a transducing relationship with a rotating magnetic recording disk 32 such that the head air bearing surface 45 (ABS) is disposed in a facing relationship with and slightly above the recording surface 34 of the disk 32. MR read/write head 30 includes an MR read assembly and an inductive write assembly formed adjacent one another on the surface of the hard electrically insulating substrate 31, typically forming the trailing end of the slider 13 (shown in FIG. 1). A "hard" substrate refers to a substrate formed of a material having a hardness in the range of about 10 to 40 GigaPascal (GPa), and more preferably, also has a Young's modulus of about 50 GPa or greater. A substrate having such properties provides the MR read/write head with enhanced durability and elasticity, thereby making the head more resistant to breakage during manufacturing and to being scratched when in use. The MR read assembly comprises an MR sensing element 35 fabricated from ferromagnetic material, such as a nickel-iron (NiFe) alloy, for example, which is interposed between first and second magnetic shield elements 33 and 37, respectively. The MR sensing element 35 may comprise a single layer of NiFe, commonly referred to as Permalloy. The MR sensing element 35 also may be implemented as a multilayer magnetic structure that includes a magnetic bias layer of the type described in U.S. Pat. No. 4,785,366 or in U.S. Pat. No. 5,206,590, each incorporated herein by reference, utilizing the giant MR effect.

The shield elements 33 and 37 are generally made of a highly permeable magnetic material, such as Permalloy or Sendust, an alloy of aluminum-silicon-iron. The magnetic shield elements 33 and 37 minimize or eliminate magnetic interferences from affecting the MR element 35 which could otherwise produce extraneous electrical pulses. Conductive leads, not shown, generally formed of copper (Cu) or other suitable conductive material, are attached electrically at the end portions of the MR element 35 to couple the MR element 35 to external circuitry for sensing the resistance of the MR element. Such conductive leads may be of the type described in commonly assigned U.S. Pat. No. 5,465,186, incorporated herein by reference.

The MR read/write head assembly may be manufactured using standard vacuum deposition techniques, such as sputter deposition, for example, on the substrate 31. The various elements of the MR assembly are surrounded and insulated from each other by layers 42 of hard insulating material, such as sputtered alumina. Other insulating material such as $SiO_2$ and SiN may also be used. Alumina is particularly desirable as an insulating material when used in conjunction with the hard insulating substrate 31 because such materials together provide MR read/write head 30 with a hard air bearing surface which is very scratch resistant, and which has lapping and etch rates very similar to those of alumina-TiC and of sapphire. The use of such materials in combination facilitates higher yield manufacturing of MR read/write head assemblies having very precisely fabricated air bearing surfaces. For example, such air bearing surfaces may have a surface roughness or microfinish in the range of about 0.1 to 1.5 nm RA (roughness average), which may be determined using scanning probe microscopy (SPM), and a flatness in the range of about 10 to 40 nm for a 2 mm scan.

Referring to FIG. 2, the inductive write assembly comprises a lower or first pole piece 38 and an upper or second pole piece 40. The first and second pole pieces 38 and 40, respectively, are preferably made of a highly permeable magnetic material such as NiFe, for example, and form a magnetic circuit magnetically connected together at a back gap portion (not shown) with the first and second pole tips 39 and 41, respectively, thereby forming a magnetic gap 47 at the air bearing surface 45. One or more layers of electrical conductors 43, generally made of Cu, for example, form an inductive coil disposed between the first and second pole pieces 38 and 40. The inductive coil, comprised of electrical conductors 43, is also connected to external circuitry via conductive leads, not shown. The pole pieces 38 and 40, and the electrical conductors 43 preferably are fabricated using well known processes such as electroplating or sputter deposition. The pole pieces 38 and 40 are insulated electrically from the inductive coil and the MR read assembly by layers 42 of electrically insulating material, such as sputtered alumina. The entire assembly then may be covered with a capping layer, not shown, of insulating and protective material, such as alumina.

The head 30 shown in FIG. 2 is sometimes referred to as a "piggyback" head. An alternate configuration is referred to as a "merged" head wherein the second MR magnetic shield element 37 (FIG. 2) is merged with the inductive assembly first pole piece 38 to form a single element 49 which performs both functions, as shown in FIG. 3.

As described above, static electrical charges may accumulate on the various components of the head assembly 30 or on any object, equipment or person which may come into contact with or closely approach the head assembly, or on any electrical leads attached to the head assembly. Such static electrical charges pose the potential for causing serious ESO/ESD damage to the head. These charges may accumulate during the manufacturing process and during subsequent handling of the heads. For example, the assembly of the head with other components in the course of manufacturing a disk drive assembly can result in relatively large amounts of static electrical charge accumulating on the head elements. The electrical charges migrate from the areas at which they are generated to build up along conductive paths. Thus, a buildup of static charge occurs that may subsequently result in a discharge from one conductive element across a dielectric, which experiences "breakdown," to another conductive element, in the manner of a capacitive discharge. The discharge typically causes damage by burnout or the like at the areas of the conductive material which act as terminals for the discharge of the stored static electrical energy.

The electrical conductors 43 comprising the inductive coil, and the magnetic pole pieces 38 and 40 can withstand relatively high voltages and currents. However, the MR sensing element 35 is particularly vulnerable to current and voltage overloads because of the its physically small cross-section. The active sensing portion of the MR sensor element 35 typically has a length in the range of 0.5 to 20 um, a width of 0.5 to 5 um, a thickness of 10 to 100 nanometers (nm), and a resistance of about 20 to 80 ohms. In MR read/write assemblies of the types shown in FIGS. 2 and 3, it has been found that ESD and/or EOS damage occurs along the sensing region of the MR element 35 when the accumulated static charge is discharged directly through the MR element 35, and not necessarily through the magnetic shield elements, first pole piece, or substrate 31 (slider body).

Figure 4:
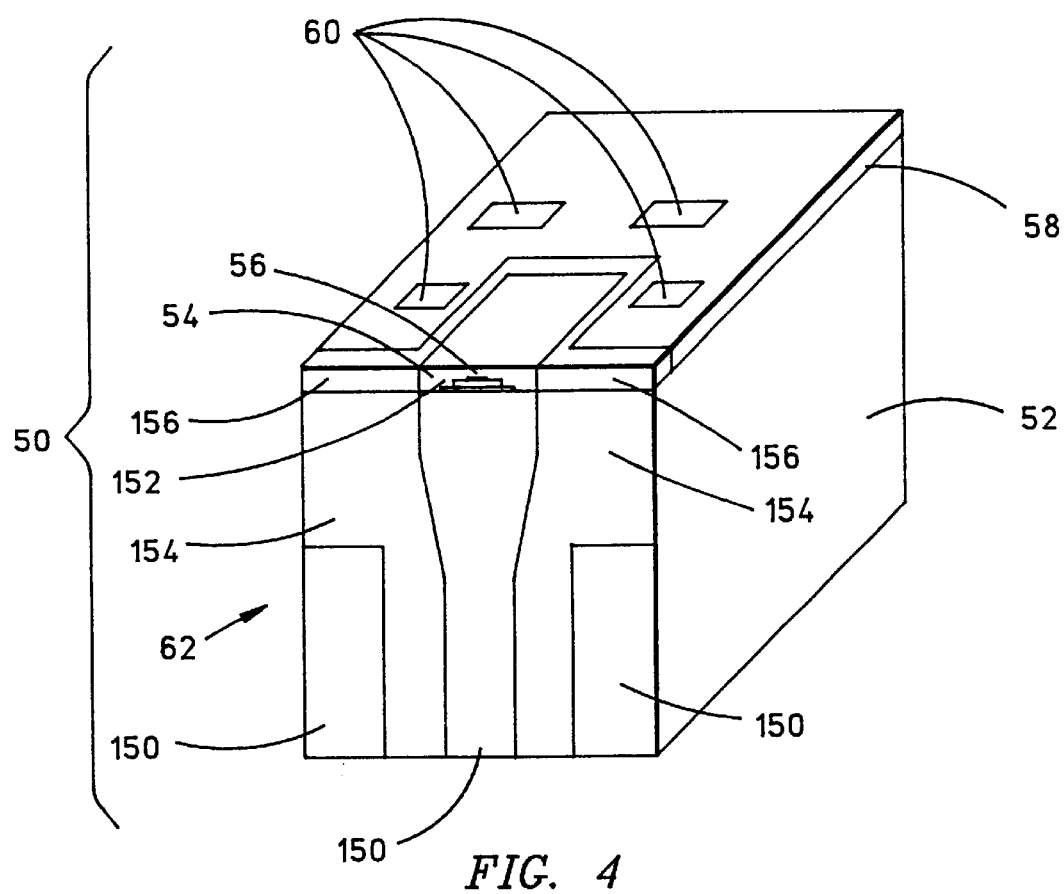
FIG. 4 is a perspective view of a magnetoresistive read/inductive write magnetic head assembly showing the air bearing surface.

Referring now to FIG. 4, there is shown a magnetoresistive read/inductive write magnetic head assembly (hereinafter also referred to as "MR head assembly") 50 embodying various features of the present invention which includes a hard electrically insulating substrate 52; multiple alumina layers 54 formed over the substrate 52; a magnetoresistive read/write inductive write head 56 positioned between the alumina layers 54; a silicon layer 58 attached to the substrate 52; and a semiconducting circuit 60 integrated into the silicon layer 58 which is interconnected to the magnetoresistive read/write inductive write head 56. Hereinafter, the "inprocess" structure resulting from any of various manufacturing processes to which the substrate 52 is subjected may be referenced as a "wafer." The magnetoresistive read/write inductive write head 56 preferably may be one of the types described hereinabove with reference to FIGS. 2 and 3. The substrate 52 preferably is made of a material which may be configured into a homogenous or non-homogenous electrically insulating structure having a hardness in the range of 10 to 40 GPa and a Young's modulus of about 50 GPa or greater. The substrate 52 may be made of sapphire or alumina-TiC because these materials have properties within the preferred ranges. Sapphire has a hardness of about 30 GPa and a Young's modulus of about 330 GPa. Alumina TiC has a hardness of about 30 GPa and a Young's modulus of about 50 GPa. However, it is to be understood that the scope of the invention also includes the use of other material systems having properties within the preferred ranges for use as a substrate material. Sapphire is the preferred substrate material because the silicon layer may be epitaxially grown on sapphire. For applications in which the substrate 52 is made of alumina-TiC, the silicon layer 58 may be bonded to the substrate. The hard and tough substrate 52 and multiple alumina layers 54 provide the MR head assembly 50 with an air bearing surface 62 having improved hardness and toughness.

An important aspect of the invention is that it provides an MR head assembly having a hard electrically insulating substrate on which a silicon layer may be affixed. The hardness and toughness of the substrate 52 provide the head 50 with enhanced durability and elasticity, thereby making the head more resistant to breakage during manufacturing and to being scratched in use. Moreover, the fact that the substrate 52 is made of a material to which a layer of silicon may be bonded, grown, or otherwise attached supports the integration of a semiconducting diode circuit 60 into the silicon layer using well known photolithographic techniques so that the MR head assembly 50 may be provided with permanent EOS and ESD protection.

Figure 5:
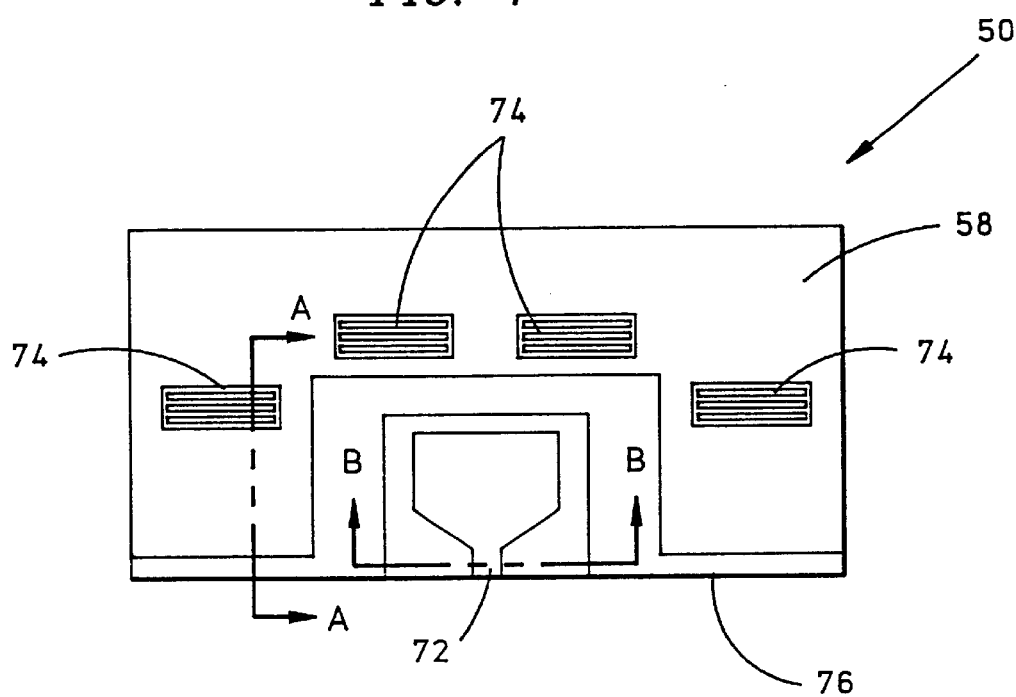
FIG. 5 is a plan view of the magnetoresistive read/inductive write magnetic head assembly of FIG. 4 that shows the diodes integrated into the silicon layer.
Figure 6:
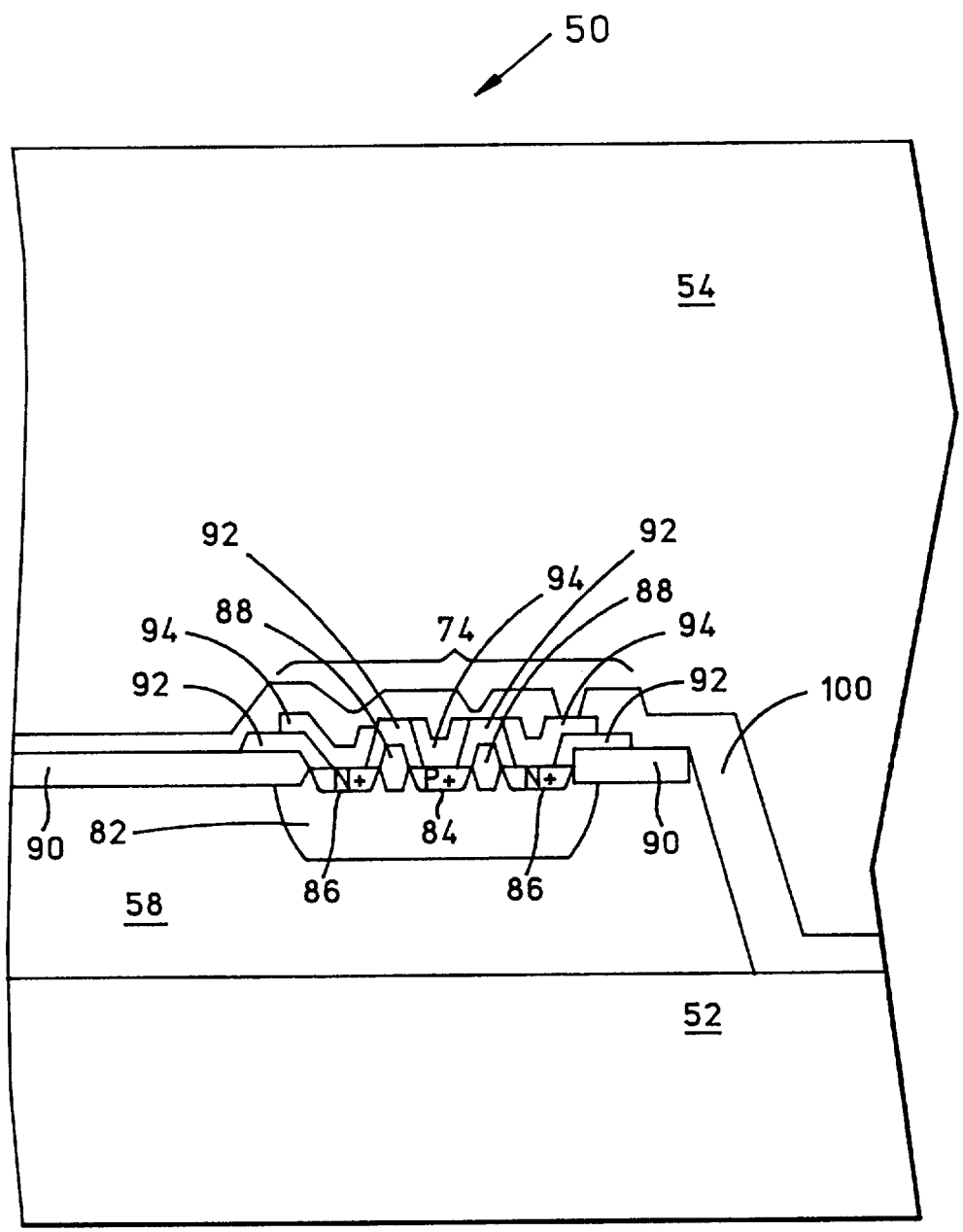
FIG. 6 is a cross-sectional view of the magnetoresistive read/inductive write head taken along view A—A of FIG. 5.
Figure 7:
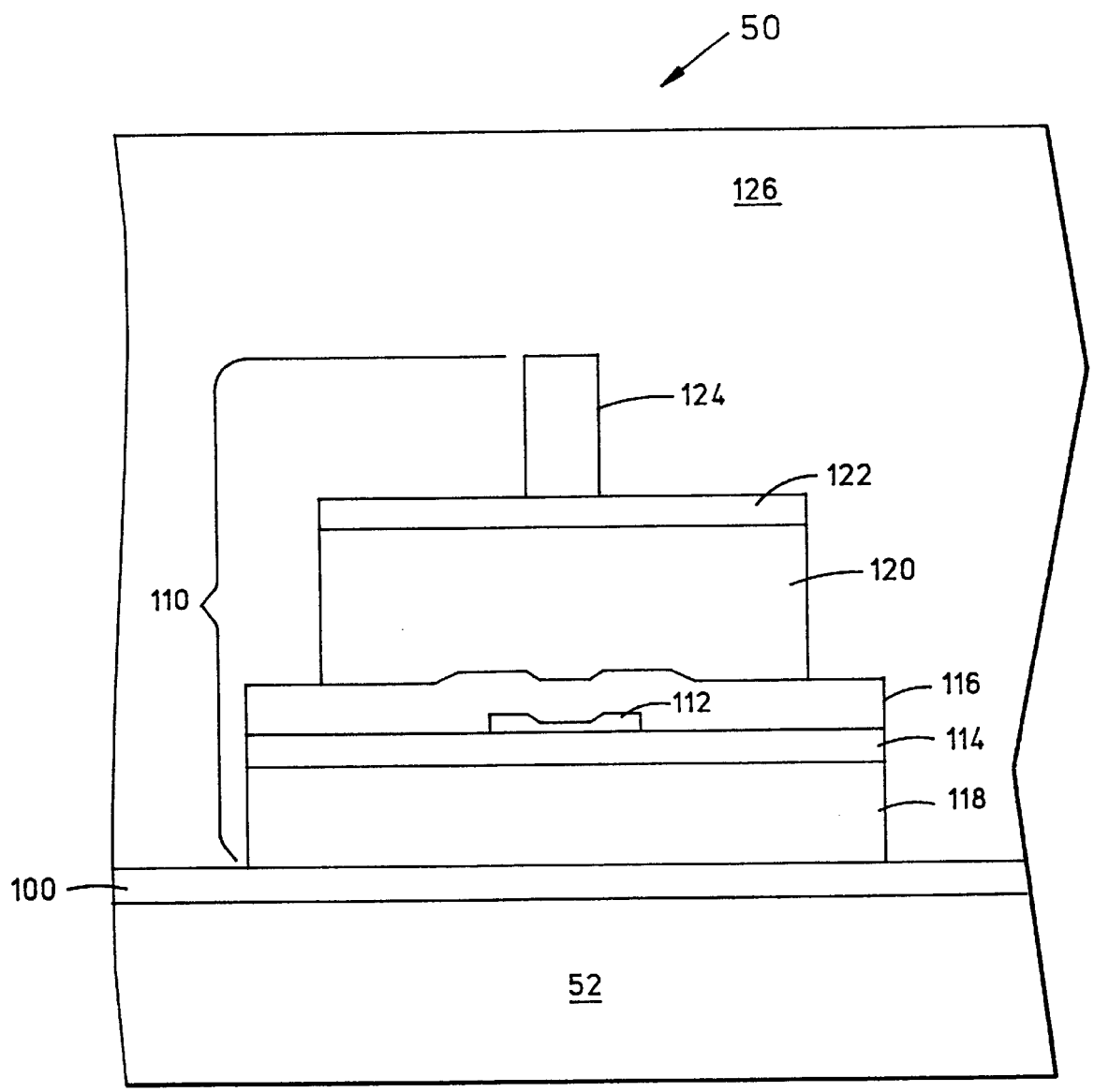
FIG. 7 is a cross-sectional view of the magnetoresistive read/inductive write head taken along view B—B of FIG. 5.

FIG. 5 is a plan view of the magnetoresistive read/inductive write magnetic head assembly 50 shown in FIG. 4. FIGS. 6 and 7 show cross-sections of an example of one implementation the MR head 50 taken along views A—A and B—B, respectively, that clearly show the layered structure the MR head assembly 50 and one semiconducting diode circuit 60 integrated into the silicon layer 58.

In FIG. 6, there is shown a silicon layer 58 that is epitaxially grown on the substrate 52, preferably made of sapphire, a single crystal form of alumina ($Al_2O_3$), with which especially high quality diodes can be made. The semiconducting circuit 60 may include one or more diodes (only one is shown) 74 integrated with the silicon layer 58 using standard photolithographic techniques. In FIG. 6, only one diode 74 is shown for purposes of illustration. However, it is to be understand that any number of diodes 74 may be integrated with the silicon layer 58 to suit the requirements of a particular application.

Each diode 74 is conventionally implemented as an integrated circuit having an n− well 82 formed in the silicon layer 58. A p+ well 84 and two n+ wells 86 then are formed, as for example, by ion implanting appropriate dopant species in the n− well 82 such that the p+ well 84 is interposed between the n+ wells 86 using standard photolithographic techniques. An electrically insulating layer 90 of silicon dioxide (SiO$_2$) then is formed over the wafer, which is selectively etched to form gap structures 88. The p+ and n+ wells 84 and 86, respectively, are separated by the electrically insulating gap structures 88 which extend into and protrude slightly above the surface of the silicon layer 58. The n+ wells 86 and the p+ well 84 are electrically coupled to external circuitry by metal interconnects 94 which are electrically insulated from each other by electrically insulating layers 92 formed over selected regions of the gap structures 88, n+ wells 86, and p+ well 84. The metal interconnects 94 may be made, for example, of aluminum or other suitable electrically conductive materials such as gold. Electrically insulating layers 92 may be formed of an electrically insulating material such as sputtered alumina. The wafer, including diode(s) 74, silicon layer 58, and sapphire substrate 52 then are covered with a sputtered alumina overcoat layer 100 to electrically isolate and seal the wafer from the external environment.

Referring to FIG. 7, MR head assembly 50 also includes a magnetoresistive read/inductive write head (hereinafter also referenced as "MR head") 110 formed on the alumina overcoat layer 100 in accordance with well known techniques. The MR head 110 includes an MR element 112 made of a ferromagnetic material such as a nickel-iron (NiFe) alloy, interposed between first and second electrically insulating gap layers 114 and 116, respectively, which preferably are formed of sputtered alumina. The first gap layer 114 may be sputtered on a first magnetic shield layer 118 formed on the overcoat layer 100, as shown. Alternatively, the shield layer 118 may be formed directly on the substrate 52 if selected regions of the overcoat layer 100 are removed from the substrate. Then, a second shield layer 120 is formed over the second gap layer 116, whereby the first and second gap layers 116 and 114, respectively, are interposed between the first and second shield layers 118 and 120, respectively. The magnetic shield layers 118 and 120 minimize or eliminate magnetic interferences from affecting the MR sensor 112, and may be made of a highly permeable magnetic material such as Permalloy or Sendust. Conductive leads, not shown, generally consisting of copper or other suitable electrically conductive material are electrically coupled to the ends of the MR sensor 110, as described in commonly assigned U.S. Pat. No. 5,465,186, incorporated herein by reference, so that the resistance of the MR sensor 110 may be sensed by external circuitry, not shown. A third gap layer 122 also preferably made from sputtered alumina is formed over the second shield layer 120. Then a pole piece 124, commonly referred to in the magnetic recording head industry as "P-2", is fabricated from ferromagnetic material, such as a NiFe alloy, over the third gap layer 122. The third gap layer 122 is thereby interposed between the second shield layer 120 and the pole piece 124. Then an electrically insulating overcoat layer 126 generally consisting of sputtered alumina may be formed over the entire wafer.

Figure 8:
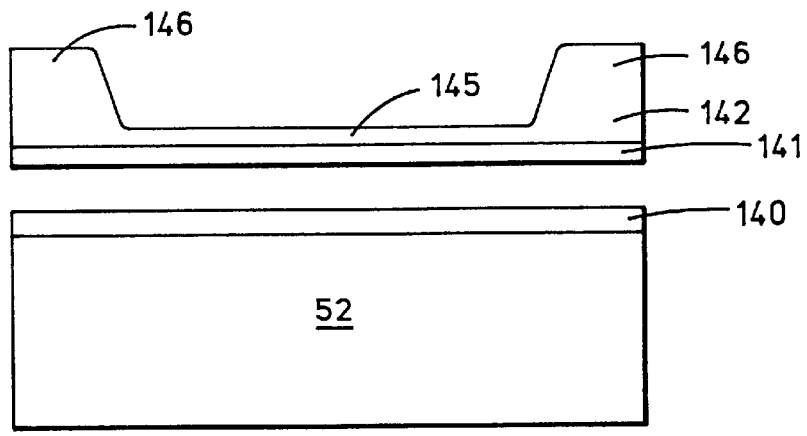
FIG. 8 shows a silicon substrate positioned above a hard electrically insulating substrate.
Figure 9:
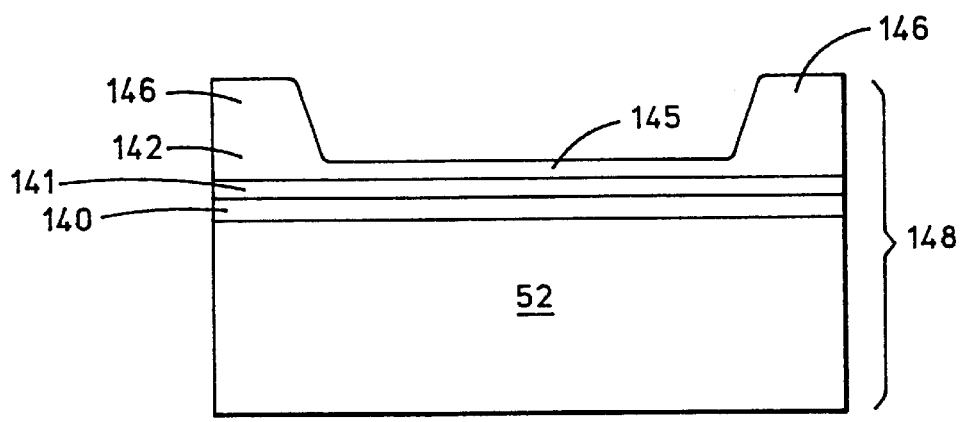
FIG. 9 shows the silicon layer bonded to a hard electrically insulating substrate.

In another embodiment of the MR head assembly 50, described with reference to FIGS. 8 and 9, a thin silicon wafer may be bonded to a thick, hard electrically insulating substrate to form a silicon film on a hard electrically insulating substrate. The hard electrically insulating substrate 52 may be formed of alumina-TiC on which a sputtered silicon dioxide (SiO$_2$) layer 140 is formed. A silicon wafer 142, on which is grown a thermal silicon dioxide layer 141, may be thinned to provide a thin membrane section or web 145 where the semiconducting circuit 60 is to be integrated. The silicon wafer 142 preferably may be a monolithic structure bounded by flanges 146 which provide rigidity to the silicon wafer 142. The thermal silicon dioxide layer 141 of silicon wafer 142 is placed in contact with the sputtered silicon dioxide layer 140 of the substrate 52. Then, the two structures 142 and 52 are heated to a temperature in the range of about 400–500 C. for a period of about 3–5 hours so that the silicon wafer 142 bonds to the silicon dioxide layer 140. Thus is formed a bonded structure 148 comprising a layer of silicon 58 bonded to a hard electrically insulating substrate 52 of alumina-TiC. It is also possible to thin the active areas 145 of the silicon wafer 142 after the wafer is bonded to the substrate 52 which allows enhanced structural rigidity during bonding. Alternatively, a layer of silicon may be deposited on an alumina-TiC substrate using plasma enhanced chemical vapor deposition techniques (PECVD). However, this alternative would in all likelihood, produce polycrystalline silicon.

Figure 10:
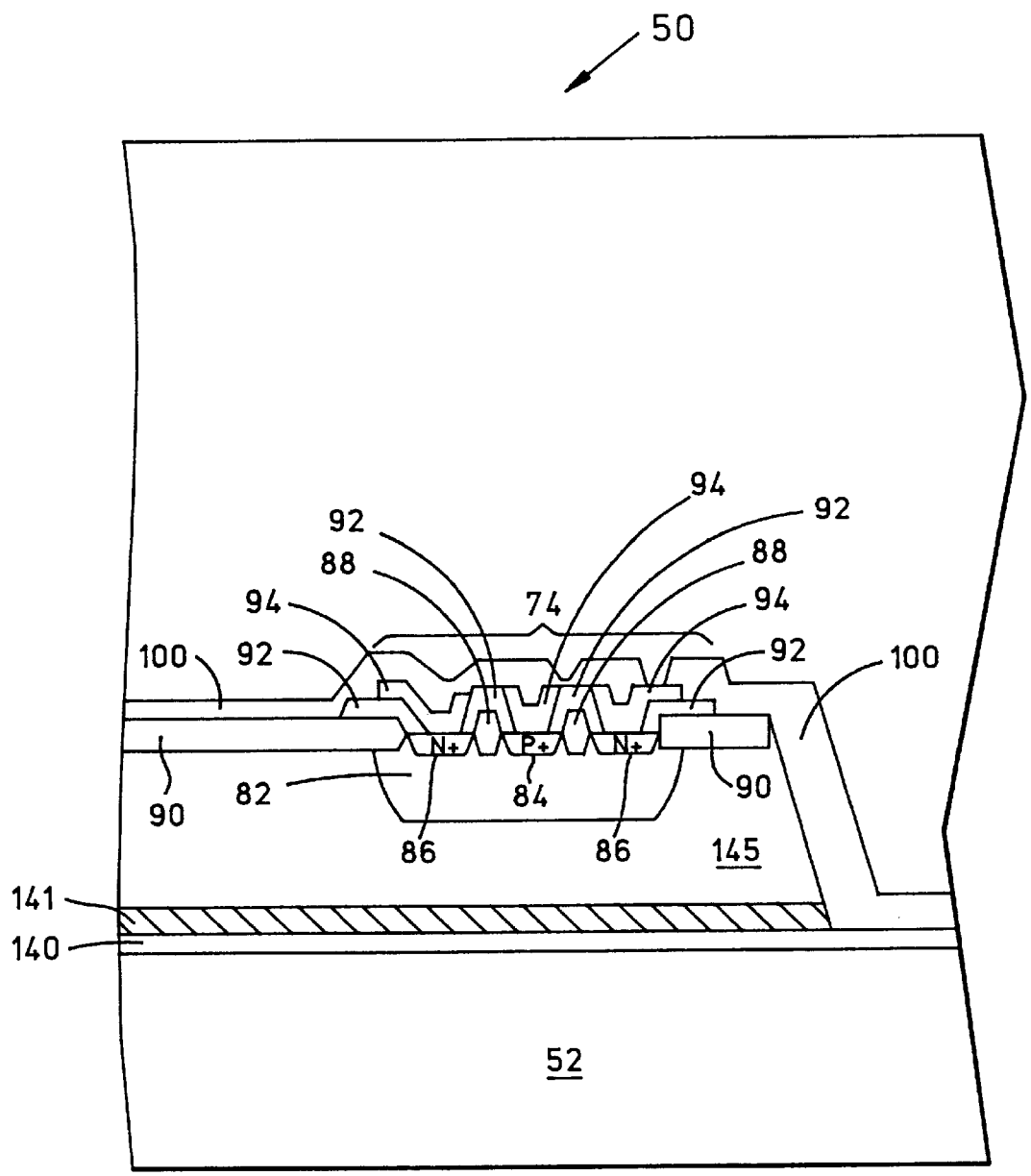
FIG. 10 shows an example of the magnetoresistive read/inductive write magnetic head assembly which includes a semiconducting circuit integrated into a silicon layer bonded to a hard electrically insulating substrate.
Figure 11:
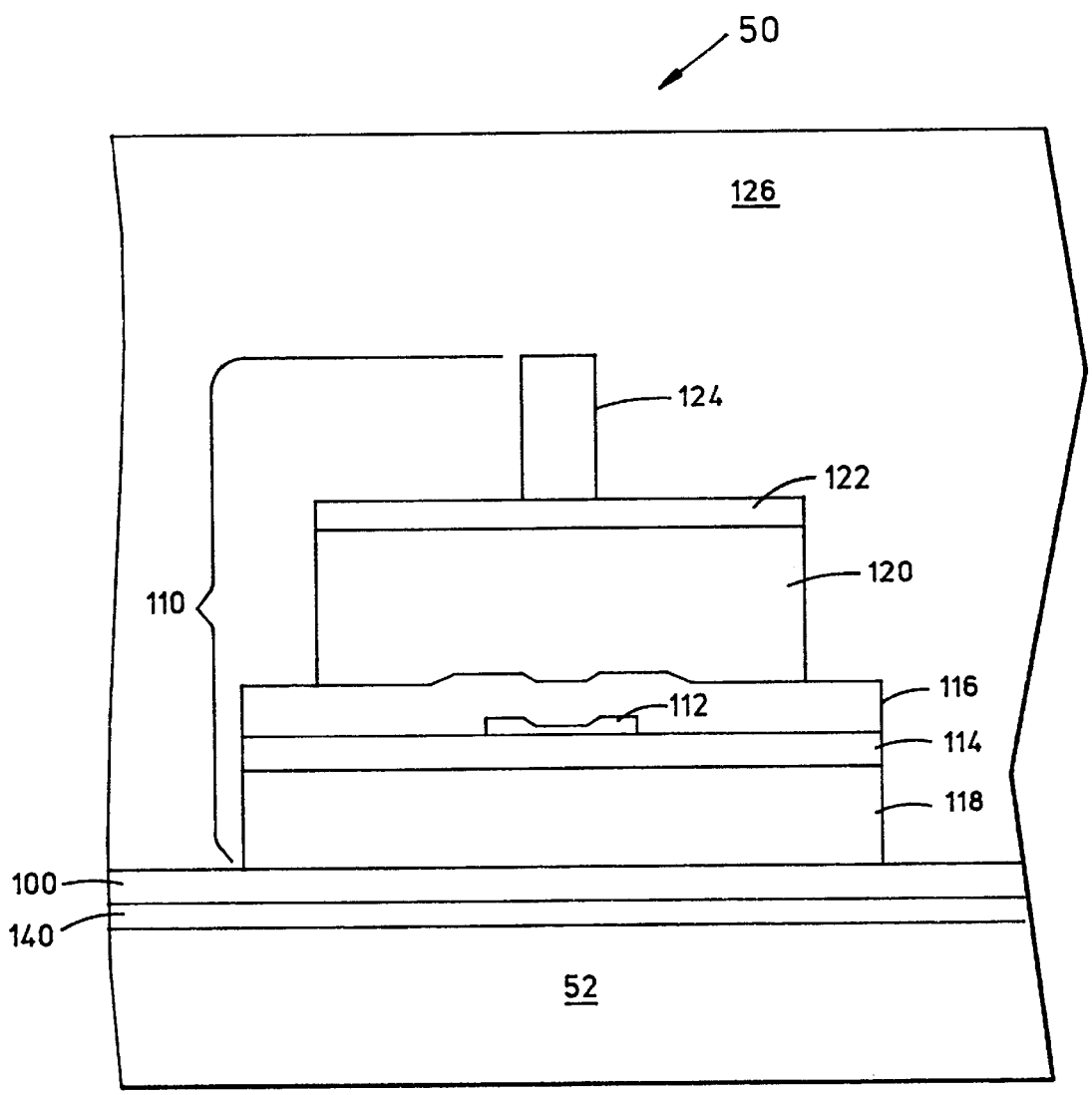
FIG. 11 shows an example of the magnetoresistive read/inductive write magnetic head assembly which includes an MR head formed on hard electrically insulating substrate that is bonded to a layer of silicon.

The silicon wafer 142, including the thermal silicon dioxide layer 141 may be etched away from regions other than the regions of silicon web 145 in which the semiconducting circuit(s) 60 is integrated to expose the hard substrate 52. The diodes 74 may be formed in the web 145 of the silicon wafer 142 as described hereinabove with reference to FIG. 6 to provide the MR read/write head assembly 50 shown in FIG. 10. The MR head of assembly 110 (FIG. 7) may be manufactured in accordance with the techniques described herein above to provide the MR head assembly 50 shown in FIG. 11.

Referring again to FIG. 4, the air bearing surface 62 of the MR head assembly 50 may be formed by lapping the surface defined by the exposed surfaces of hard substrate 52; and as shown in FIGS. 6 and 7, alumina layer 100, the first and second shield layers 118 and 120, the MR sensor 112, the gap layers 114, 116, and 122, and the P-2 pole piece 124. The lapped air bearing surface 62 (FIG. 4) preferably has a microfinish or surface roughness which may be in the range of 0.1 to 1.5 nm RA (roughness average) and a flatness in the range of 10 to 40 nm over a 2 mm span. The surface microfinish and flatness of the lapped air bearing surface 62 may be determined using SPM measurement tools. The entire air bearing surface 62 except for the metals comprising the MR head 110, consist of either sapphire (single crystal alumina) or sputtered alumina and, therefore, have generally uniform lapping rates. Such lapping rates allow the air bearing surface 62 to be lapped with great precision.

After being lapped, selected regions of the air bearing surface 62 may be etched using standard photolithographic techniques to a depth in the range, for example, of 0.1 to 5.0 um to control the aerodynamic lift characteristics of the surface 62. In one preferred embodiment, limiting the lift characteristics of the air bearing surface 62 is desired so that the MR head assembly 50 flies above the spinning disk 32 at a predetermined height, h, as for example, 1.5±0.5 microinches, as shown in FIGS. 2–3. After being etched, the air bearing surface includes lapped substrate (sapphire or alumina-TiC, for example) regions 150, lapped alumina region 152, etched substrate regions 154, and etched alumina regions 156.

Figure 12:
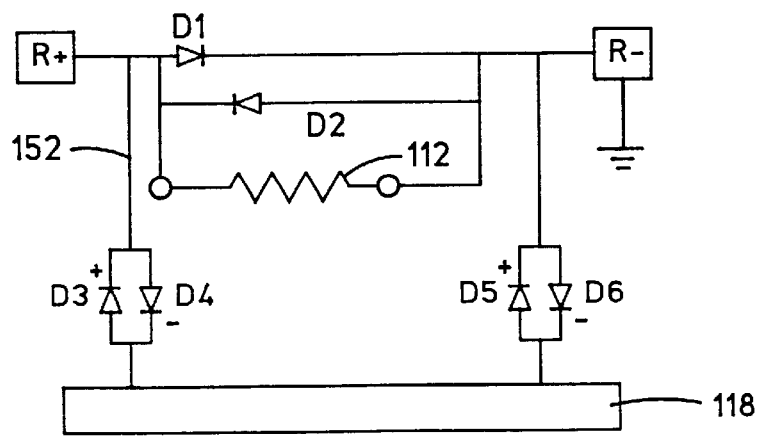
FIG. 12 is a schematic diagram showing the interconnections of diodes to the first shield element and across the magnetoresistive sensor.

In FIG. 12 there is shown, by way of example, an electrical schematic diagram of the interconnections between diodes 74 of semiconducting circuit 60, MR sensing element 112, and the first magnetic shield layer 118 of MR head assembly 50. Opposed diodes D1 and D2 are connected in parallel across the MR sensor 112. The diodes D1 and D2 collectively provide a circuit path which shorts, within limits, any EOS and/or ESD around the MR sensor 112 which may accumulate at either a node R+ having a positive voltage potential with respect to the MR sensor 112, or at a node R− having a negative voltage potential with respect to the MR sensor 112. Optionally, opposed diodes D3 and D4 may be connected in parallel to provide a short circuit path between node R+ and the magnetic shield element 118. Similarly, as another option, opposed diodes D5 and D6 may be connected in parallel to provide a short circuit path between node R− and the magnetic shield element 118. Diodes D1–D6 may be of the type described with reference hereinabove to diode 74. Typically, these diodes exhibit, at their operating points, an operating voltage ($V_{op}$) of approximately 0.6 volts, forward current ($I_f$) of less that 2 milliamps, a reverge current ($I_r$) less than $I_f$, a capacitance of less that 50 picofarads, and a series resistance ($R_{series}$) of less than 5 ohms. The diodes D1–D6 may be integrated into the silicon layer 58 of FIG. 6 or into the silicon membrane 145 of wafer 148 (FIG. 9) and interconnected to the MR sensor 112 and magnetic shield element 118 in accordance with well known integrated circuit manufacturing techniques.

Ideally, the resistance of each of diodes D1–D6 would be zero so that no current would flow through the MR sensing element 112. However, in practice, a finite resistance, $R_{short}$ of any forward biased diode, and the MR sensor 112, represented by $R_{MR}$, form a parallel circuit in which the amount of the current flow through the MR sensing element is given by:

$$I_{MR}=I_r \times R_{short}/(R_{short}+R_{MR}).$$

Thus, to minimize the current through the MR sensor 112, the resistance of each of diodes D1–D6, $R_{short}$, should be as small as can practically be obtained. In general, to be effective, the upper limit for the short circuit resistance is give by: $R_{short}<0.5 R_{MR}$. However, in any practical implementation, $R_{short}$ will be much less than this upper limit.

We claim:

1. A method for manufacturing a magnetoresistive head assembly with integrated electrostatic discharge protection, comprising:

providing a substrate for a slider;

epitaxially forming a silicon layer on the substrate;

forming electrostatic discharge protective circuits on the silicon layer;

depositing a first protective layer of alumina over the electrostatic discharge protective circuits on the silicon layer to mechanically protect and electrically insulate the electrostatic discharge protective circuits;

forming on the first protective layer of alumina a layered structure including a magnetoresistive read/inductive write head, the forming of the layered structure including electrically connecting the electrostatic discharge protective circuits and the magnetoresistive read/inductive write head, the magnetoresistive read/inductive write head having layers of alumina to provide durability to the magnetoresistive read/inductive write head; and depositing a second protective layer of alumina over the first layer of alumina and the layered structure as an electrical insulation layer.

2. The method of claim 1, wherein the substrate consists essentially of sapphire.

3. The method of claim 1, where in the substrate has a hardness of at least 10 Gpa.

4. The method of claim 1, further comprising lapping a surface defined by the substrate and the layered structure to form an air bearing surface.

5. The method of claim 4, further comprising etching the air bearing surface.

6. The method of claim 1, wherein the electrostatic discharge protective circuits formed on the silicon layer include diodes.

7. The method of claim 6, wherein forming the layered structure includes forming a magnetoresistive sensor and electrically connecting includes interconnecting the diodes to create an opposed diode pair electrically connected in parallel with the magnetoresistive sensor.

8. The method of claim 6, wherein forming the layered structure includes forming a magnetic shield element, and electrically connecting includes interconnecting the diodes to create an opposed diode pair electrically connected to the magnetic shield element.

* * * * *

UNITED STATES PATENT AND TRADEMARK OFFICE
CERTIFICATE OF CORRECTION

PATENT NO. : 6,607,923 B2  Page 1 of 1
DATED : August 19, 2003
INVENTOR(S) : Carr et al.

It is certified that error appears in the above-identified patent and that said Letters Patent is hereby corrected as shown below:

<u>Title page,</u>
Item [62], Related U.S. Application Data, "1994" should read -- 1996 --.
Item [56], References Cited, FOREIGN PATENT DOCUMENTS,
"JP 08-227508 9/1936" should read -- JP 08-227508 9/1996 --.

Signed and Sealed this

Seventeenth Day of February, 2004

JON W. DUDAS
*Acting Director of the United States Patent and Trademark Office*